(12) United States Patent
Nelson et al.

(10) Patent No.: US 8,310,922 B2
(45) Date of Patent: Nov. 13, 2012

(54) SUMMARIZING INTERNET TRAFFIC PATTERNS

(75) Inventors: Jelani Osei Nelson, St. Thomas, VI (US); David Paul Woodruff, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 12/760,584

(22) Filed: Apr. 15, 2010

(65) Prior Publication Data

US 2011/0255424 A1    Oct. 20, 2011

(51) Int. Cl.
*H04L 12/26* (2006.01)
*H04L 12/56* (2006.01)
(52) U.S. Cl. ......... 370/229; 370/252; 370/254; 709/224
(58) Field of Classification Search .................. None
See application file for complete search history.

(56) References Cited

U.S. PATENT DOCUMENTS

| | | | |
|---|---|---|---|
| 6,690,951 B1* | 2/2004 | Cuffaro et al. | 455/560 |
| 6,868,062 B1* | 3/2005 | Yadav et al. | 370/234 |
| 7,002,980 B1 | 2/2006 | Brewer et al. | |
| 7,397,766 B2* | 7/2008 | Kodialam et al. | 370/252 |
| 7,898,949 B2* | 3/2011 | Valluri et al. | 370/230.1 |
| 8,166,138 B2* | 4/2012 | Carter | 709/220 |
| 2005/0039086 A1 | 2/2005 | Krishnamurthy et al. | |
| 2005/0220023 A1* | 10/2005 | Kodialam et al. | 370/235 |
| 2007/0140131 A1 | 6/2007 | Malloy et al. | |
| 2007/0240061 A1 | 10/2007 | Cormode et al. | |
| 2008/0219181 A1 | 9/2008 | Kodialam et al. | |
| 2009/0006607 A1* | 1/2009 | Bu et al. | 709/224 |
| 2009/0073891 A1 | 3/2009 | Duffield et al. | |
| 2009/0144414 A1 | 6/2009 | Dolisy | |
| 2009/0185486 A1 | 7/2009 | Gerber et al. | |

OTHER PUBLICATIONS

Feigenbaum et al.; An Approximate L1-Difference Algorithm for Massive Data Streams; Siam J. Comput. vol. 32, No. 1, pp. 131-151; copyright—2002 Society for Industrial and Applied Mathematics.
Cohen et al.; Algorithms and Estimators for Accurate Summarization of Internet Traffic; IMC'07, Oct. 24-26, 2007, San Diego, California, USA., Copyright 2007 ACM 978-1-59593-908-1/07/0010; 14 pages.
Cormode et al.; Sketching Streams Through the Net: Distributed Approximate Query Tracking; Proceedings of the 31st VLDB Conference, Trondheim, Norway, 2005; pp. 13-24.

(Continued)

*Primary Examiner* — Chi Pham
*Assistant Examiner* — Soon-Dong D Hyun
(74) *Attorney, Agent, or Firm* — Schmeiser, Olsen & Watts

(57) ABSTRACT

A method and system for monitoring network traffic by estimating an $L_1$ difference. Sketches in the form $(x, f_t(x))$ are received from first and second network devices, where x indicates a source-destination pair, and $f_t(x)$ indicates an amount of information transmitted via the network device from the source to the destination in a time period t. An $L_1$ difference between $f_t(x)$ values is estimated by determining an $L_0$ value of a data stream resulting from the first network device inserting elements of a first set of distinct items as insertions into the data stream and from the second network device inserting elements of a second set as deletions from the data stream. Determining the $L_0$ value includes processing updates to ranges of the data stream. Based on the $L_1$ difference, a pattern of the network traffic is determined.

20 Claims, 6 Drawing Sheets

OTHER PUBLICATIONS

Krishnamurthy et al.; Sketch-based Change Detection: Methods, Evaluation, and Applications; IMC '03, Oct. 27-29, 2003, Miami Beach, Florida, USA., Copyright 2003 ACM 1-58113-773-7/03/0010C.

Schweller et al.; Reversible Sketches for Efficient and Accurate Change Detection over Network Data Streams; IMC '04, Oct. 25-27, 2004, Taormina, Sicily, Italy; Copyright 2004 ACM 1-58113-821-0/04/0010.

* cited by examiner

SUMMARIZING INTERNET TRAFFIC PATTERNS

FIELD OF THE INVENTION

The present invention relates to a data processing method and system for monitoring traffic on a computer network, and more particularly to a technique for efficiently summarizing Internet traffic patterns.

BACKGROUND OF THE INVENTION

Efficient processing of massive databases is a challenging and important task in applications such as observational sciences, product marketing and monitoring large systems. A data set being processed by in a massive database may be distributed across several network devices, each receiving a portion of the data as a stream. The devices locally process their data, producing a small sketch, which can then be transmitted to other devices for further processing. Known techniques focus on producing sketches of minimal size for various problems, thereby providing space-efficient processing, while failing to adequately provide time-efficient processing. Thus, there exists a need to overcome at least one of the preceding deficiencies and limitations of the related art.

SUMMARY OF THE INVENTION

In one or more embodiments, the present invention provides a computer-implemented method of monitoring network traffic by estimating an $L_1$ difference. The method comprises:

receiving a first sketch s(x) from a first network device and a second sketch from a second network device, wherein the first sketch describes a first set of pairs of data (x, $f_t(x)$), wherein x indicates a source and a destination of a first plurality of data packets that include input x, transmitted via the first network device, wherein $f_t(x)$ indicates a first amount of information in the first plurality of data packets transmitted via the first network device from the source to the destination in a time period t, wherein the second sketch s(y) describes a second set of pairs of data (y, $f_{t'}(y)$), wherein y indicates the source and the destination of a second plurality of data packets that include input y transmitted via the second network device, wherein $f_{t'}'(y)$ indicates a second amount of information in the second plurality of data packets transmitted via the second network device from the source to the destination in a time period t';

a processor of a computer system estimating an $L_1$ difference $\|f_t(x)-f_{t'}(y)\|_1$, wherein the estimating the $L_1$ difference includes determining an $L_0$ value of a data stream resulting from the first network device inserting elements of a first set of distinct items as insertions into the data stream and from the second network device inserting elements of a second set as deletions from the data stream, wherein the first set includes distinct items derived from $x_i$, wherein the second set of distinct items includes distinct items derived from $y_i$, and wherein the determining the $L_0$ value includes processing updates to ranges of the data stream; and determining a pattern of the network traffic based on the $L_1$ difference.

A system and program product corresponding to the above-summarized method are also described and claimed herein.

Embodiments of the present invention provide space- and time-efficient sketches for the determination of an L1 distance for summarizing contents of databases distributed over a network and for Internet traffic monitoring. Furthermore, embodiments of the present invention allow network devices to compute their sketches in only $O(n \log^2(nM))$ time.

DETAILED DESCRIPTION OF THE INVENTION

Overview

Figure 1:
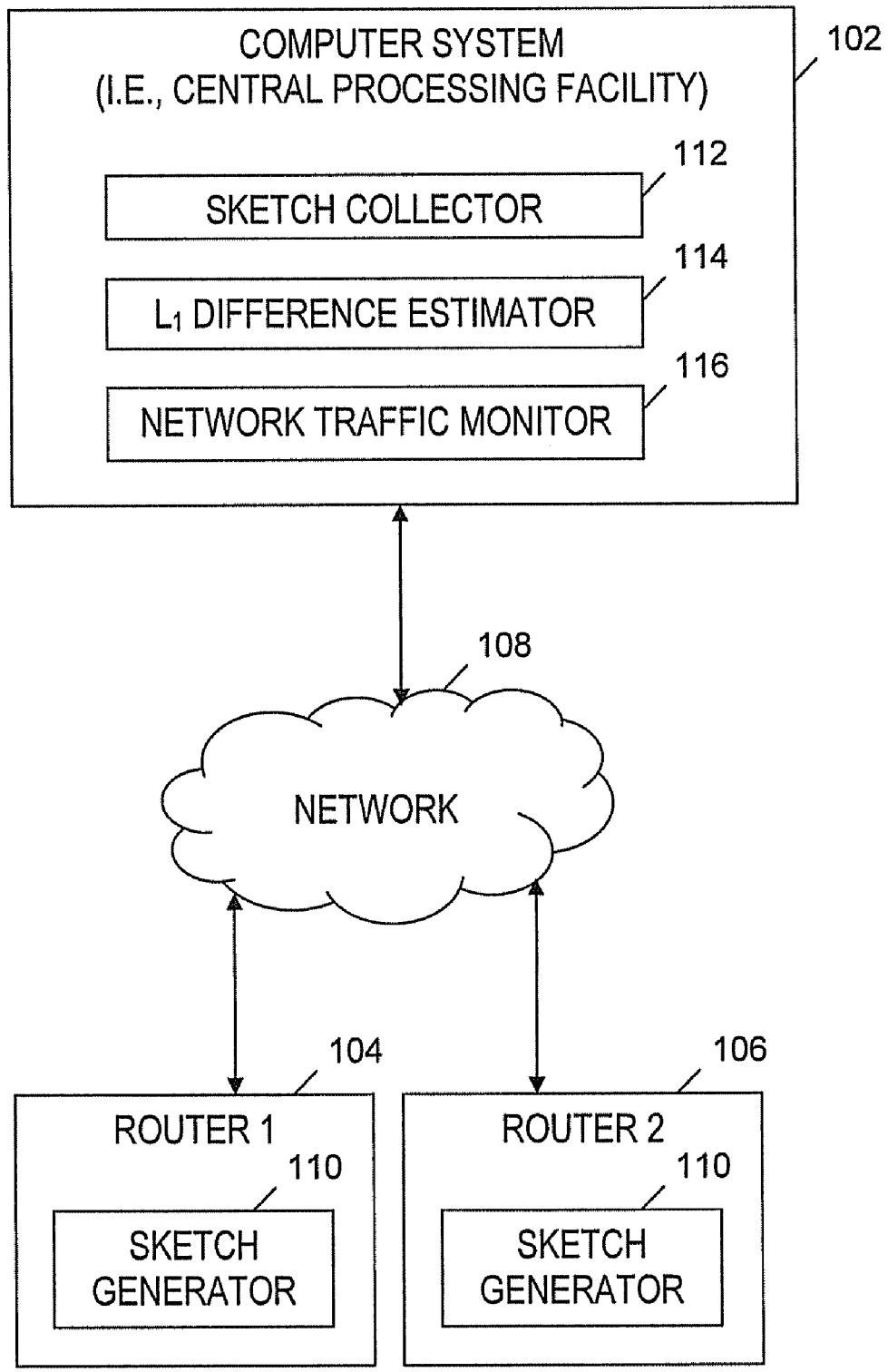
FIG. 1 is a block diagram of a system for monitoring network traffic using a sketching procedure, in accordance with embodiments of the present invention.

The problem of producing space-efficient and time-efficient sketches for the $L_1$ distance (i.e., the Manhattan distance) has applications related to summarizing contents of databases distributed over a network, and is especially useful for monitoring computer network traffic (e.g., monitoring Internet traffic). Embodiments of the present invention describe a method and system that utilizes a sketching procedure that provides nearly-optimal sized sketches for $L_1$ in nearly linear time. Specifically, suppose a first computing device (e.g., a first router) receives a vector $x \in \{-M, \ldots, M\}^n$ of data, a second computing device (e.g., a second router) receives a vector $y \in \{-M, \ldots, M\}^n$ of data, and the first and second computing devices share randomness. As used herein, computing devices that share randomness are computing devices that have access to a shared random key, such as a cryptographic key or a public book of random numbers. Hereinafter, the first and second computing devices are also referred to as "Alice" and "Bob," respectively. Alice and Bob also receive a parameter $0<\epsilon\leq 1$. Alice outputs a sketch s(x), and Bob outputs a sketch s(y), such that a third party (e.g., a computer system) can later quickly recover $(1\pm\epsilon)\|x-y\|_1$, i.e., a value $Z \in [(1-\epsilon)\|x-y\|_1, (1+\epsilon)\|x-y\|_1]$, given only s(x) and s(y). As used herein, $\|x-y\|_1 = \Sigma_{i=1}^n |x_i-y_i|$ and denotes the $L_1$-norm of the vector x−y (i.e., denotes the $L_1$-difference of x and y). The third party succeeds with probability at least ⅔ over the randomness of Alice and Bob.

In embodiments of the present invention, Alice and Bob run a sketching procedure to compute the sketches s(x) and s(y) in $O(n \log^2(nM))$ processing time, which is independent of $\epsilon$. The size of each of the sketches s(x) and s(y) is a nearly-optimal $O(\epsilon^{-2} \log(1/\epsilon)\log(nM))$ bits. Thus, the time for a third party to recover a $(1\pm\epsilon)$-approximation to the $L_1$-difference, given the sketches, is nearly linear in the sketch size. Furthermore, the sketching procedure disclosed herein may be implemented as a one-pass streaming algorithm over an adversarial ordering of the coordinates of x, y (i.e., the sketching procedure works even if the entries of x, y are given in arbitrary order in a data stream). Hereinafter, the sketching procedure is also referred to as a streaming algorithm.

A known sketching procedure for estimating the $L_1$-difference is described in Feigenbaum et al., An approximate L1-difference algorithm for massive data streams, *SIAM Journal on Computing* 32(1):131-151, 2002, achieves an optimal sketch length of $O(\epsilon^{-2} \log(nM))$ bits, but has a running time of $O(n \log(nM)/\epsilon^2)$, which unlike the present invention, is dependent upon $\epsilon$.

Although systems and methods are discussed herein relative to network traffic monitoring, it will be apparent to those skilled in the art that the systems and methods may be modified so that databases generate sketches of their data, and the central processing facility receives the sketches from the databases and given the received sketches, determines whether or not the databases include the same data.

System for Monitoring Network Traffic

FIG. 1 is a block diagram of a system for monitoring network traffic using a sketching procedure, in accordance with embodiments of the present invention. System 100 includes a computer system 102, a first router 104 and a second router 106. The first and second routers 104, 106 exchange information with computer system 102 via a network 108. First and second routers 104, 106 receive data packets included in data streams via network 108 (e.g., the Internet) or another network (not shown). One or more other routers (not shown) may also receive data packets via network 108 or another network, and exchange information with computer system 102.

Router 104, router 106 and any other router (not shown) each include a software-based sketch generator 110 that generates a sketch (i.e., a summary or description) of information of a flow (a.k.a. flow information), where the flow includes a vector of data received by the router that includes the sketch generator. The characteristics of a sketch generated by sketch generator 110 are presented below relative to the discussion of FIG. 2. Although not shown in FIG. 1, each of the routers 104 and 106 may include a processor and a memory that includes code containing instructions that are carried out by the processor to generate a sketch.

Computer system 102 includes the following software-based components: a sketch collector 112, an $L_1$-difference estimator 114, and a network traffic monitor 116. Sketch collector 112 receives sketches from routers 104, 106 via network 108. $L_1$-difference estimator 114 estimates an $L_1$-difference between one vector of data received by router 104 and another vector of data received by router 106. To estimate the $L_1$-difference, $L_1$-difference estimator 114 uses one sketch generated by router 104 and received by sketch collector 112 and another sketch generated by router 106 and received by sketch collector 112, as described below relative to FIG. 2, FIG. 3, and FIGS. 4A-4B. Network traffic monitor 116 utilizes the $L_1$-difference estimated by $L_1$-difference estimator 114 to determine network traffic via network 108 and may send instructions to router 104 and/or router 106 to manage network traffic. In one embodiment, monitor 116 monitors Internet traffic.

Details of the functionality of computer system 102 and its components, and the functionality of routers 104, 106, and their respective components are included in the discussions presented below relative to FIG. 2, FIG. 3 and FIGS. 4A-4B.

In one embodiment, the aforementioned Alice and Bob are implemented as routers 104 and 106, respectively, and the aforementioned third party that recovers $(1\pm\epsilon)\|x-y\|_1$, given only sketches s(x) and s(y) respectively generated by Alice and Bob is implemented as computer system 102.

Procedure for Internet Traffic Monitoring

Figure 2:
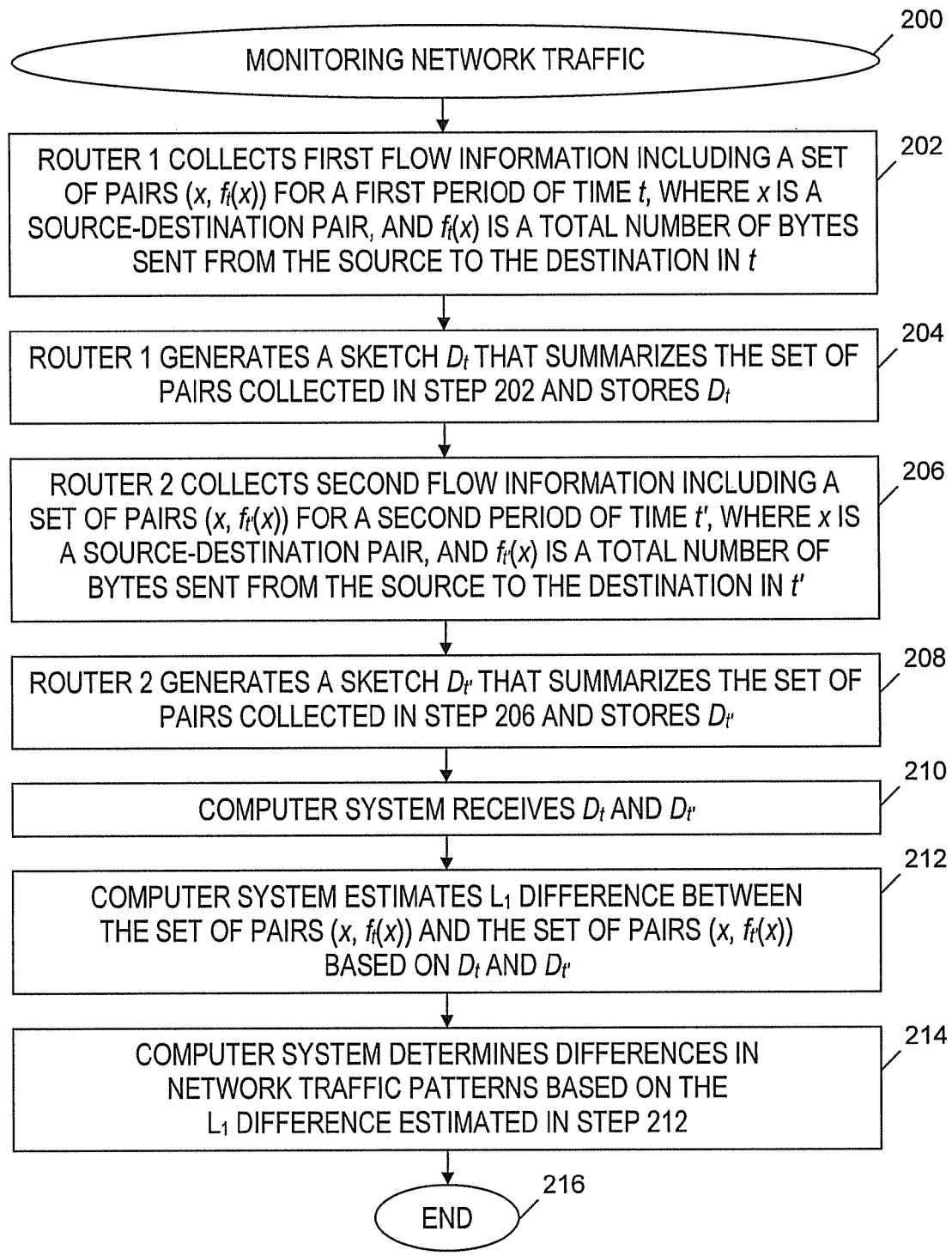
FIG. 2 is a flowchart of a process for monitoring network traffic using a sketching procedure, where the process may be implemented in the system of FIG. 1, in accordance with embodiments of the present invention.

FIG. 2 is a flowchart of a process for monitoring network traffic using a sketching procedure, where the process may be implemented in the system of FIG. 1, in accordance with embodiments of the present invention. In one embodiment, the process in FIG. 2 employs the sketching procedure disclosed herein to monitor Internet traffic. The network traffic monitoring process begins at step 200. As data packets travel through routers including routers 104 and 106 (see FIG. 1), software (e.g., NetFlow offered by Cisco Systems, Inc. located in San Jose, Calif.) running on the routers produces summary statistics of groups of data packets, where the packets in a group of packets have the same source and destination (e.g., the same source and destination Internet Protocol (IP) address). Each of the aforementioned groups of packets is referred to herein as a flow. In step 202, a first router (e.g., router 104 (see FIG. 1)) collects information about a first flow, where the information includes a set of pairs $(x, f_t(x))$, where x indicates the source and destination (i.e., a source-destination pair) of data packets in the first flow, and where $f_t(x)$ is a measurement of the amount of digital information (e.g., the total number of bytes) sent in the first flow from the source to the destination in a time period t. In step 204, the sketch generator 110 in the first router generates a sketch $D_t$ that describes and summarizes the set of pairs collected in step 202. Step 204 also includes the first router storing the sketch $D_t$ in memory (not shown in FIG. 1) included in the first router.

In step 206, a second router (e.g., router 106 (see FIG. 1)) collects information about a second flow, where the collected information about the second flow includes a set of pairs $(x, f_{t'}(x))$, where x is a source-destination pair for the second flow, and where $f_{t'}(x)$ is a measurement of the amount of digital information (e.g., the total number of bytes) sent in the second flow from the source to the destination in a time period t'. In step 208, the sketch generator 110 in the second router generates a sketch $D_{t'}$ that describes and summarizes the set of pairs collected in step 206. Step 208 also includes the second router storing the sketch $D_{t'}$ in memory (not shown in FIG. 1) included in the second router.

In one embodiment, the first router and the second router are the same router and time period t and t' are different time periods. In another embodiment, the first router and the second router are different routers and time periods t and t' are the same time period.

In step 210, sketch collector 112 (see FIG. 1) running in computer system 102 (see FIG. 1) receives sketches $D_t$ and $D_{t'}$ from the first router and the second router, respectively. In step 212, $L_1$ difference estimator 114 (see FIG. 1) running in computer system 102 (see FIG. 1) estimates the $L_1$ difference between the set of pairs collected in step 202 and the set of pairs collected in step 206. The estimation of the $L_1$ difference in step 212 is based on sketches $D_t$ and $D_{t'}$. It should be noted that "$L_1$ difference" and "$L_1$-difference" are used synonymously herein.

In step 214, network traffic monitor 116 running in computer system 102 determines differences in traffic patterns on network 108 (see FIG. 1) based on the $L_1$-difference estimated in step 212. In one embodiment, the estimated $L_1$-difference between such sets of pairs assembled during different time periods or at different routers indicates a change in Internet traffic patterns and may thereby indicate a denial of service attack if the estimated $L_1$-difference is substantially large based on predefined criteria, or that network links are becoming congested. If the estimated $L_1$-difference indicates that links are becoming congested, then one or more other routers (i.e., other than the routers 104 and 106 in FIG. 1) that were previously not in use may be automatically activated by computer system 102. The automatic activation of the other router(s) allows an updated routing scheme to be available to data packets (i.e., the data packets may follow a different set of links as compared to the links available before the automatic activation of the one or more other routers). The process of FIG. 2 ends at step 216.

The aforementioned set of pairs (x, $f_t(x)$) may be very large for the given time period t, and the method described herein provides a very fast (i.e., in near linear time) procedure for sweeping through the set and producing a very short (i.e., logarithmic size in the original description of the set) description $D_t$ of the set of pairs.

Since storing the complete set of pairs is expensive in terms of computer data storage resources required, router 104 in FIG. 1 may, for example, simply store the short description $D_t$ of the set of pairs and remove the set of pairs from the router's memory contents (see step 204). Later, at a second time period t', which is subsequent to time period t, the router 104 (see FIG. 1) may obtain a second set of pairs (x, $f_{t'}(x)$) and run the same procedure to obtain a second short description $D_{t'}$, store the description $D_{t'}$ in memory, and remove the set of pairs (x, $f_{t'}(x)$) from the router's memory contents (see step 208). The descriptions obtained by the router have the property that given $D_t$ and $D_{t'}$, the method described herein quickly (i.e., in near linear time in the size of $D_t$ and $D_{t'}$) estimates the value $\Sigma_x |f_t(x)-f_{t'}(x)|$ (see step 212), which measures differences in traffic patterns across the two time periods (see step 214). This estimated value is more robust and less sensitive to outliers than other measures, such as $\Sigma_x (f_t(x)-f_{t'}(x))^2$.

The ability of sketch generator 110 (see FIG. 1) to produce a short sketch in step 204 summarizing the set of pairs collected in step 202 and another short sketch in step 208 summarizing the set of pairs collected in step 206 allows a central control and storage facility (a.k.a. central processing facility; i.e., computer system 102 in FIG. 1) to later efficiently approximate the $L_1$-difference (see step 212) between the sketches that the central processing facility receives (see step 210). The routers 104, 106 (see FIG. 1) producing the sketches cannot predict which source-destination pairs they will receive, or in which order. Since the routers 104, 106 (see FIG. 1) can transmit their sketches and updates to the central processing facility 102 (see FIG. 1) in an arbitrarily interleaved manner, the $L_1$-difference algorithm disclosed herein supports arbitrary permutations of the assembled sets of values. Because of the substantially large size of the packet streams, it is advantageous for the update time to produce the sketches to be as small as possible.

Sketching Procedure Introduction

In one embodiment of the method of summarizing Internet traffic patterns, the $L_1$-difference problem is embedded into $L_0$, the number of non-zero coordinates of the underlying vector (i.e., x−y) presented as data stream. Suppose for simplicity $x_i$, $y_i \geq 0$ for all $i \in [n]$. In this embodiment, Alice treats her input x, as a set of distinct items M(i−1)+1, . . . , M(i−1)+$x_i$, while Bob treats his input $y_i$ as a set of distinct items M(i−1)+1, . . . , M(i−1)+$y_i$. The size of the set-difference of these two sets of distinct items is $|x_i - y_i|$. Thus, if Alice inserts all of the set elements corresponding to her coordinates as insertions into an $L_0$-algorithm, while Bob inserts all of the set elements corresponding to his coordinates as deletions in the $L_0$-algorithm, the $L_0$-value in the resulting stream equals $\|x-y\|_1$. In known techniques, the problem with directly reducing to $L_0$ is that, while the space of the resulting $L_1$-difference algorithm is an optimal $O(\epsilon^{-2} \log(nM))$, the processing time can be as large as $O(nM)$ because each set element must be inserted into the $L_0$-algorithm. The present invention overcomes this problem by providing a range-efficient $L_0$ algorithm that allows updates to ranges at a time, which works for streams coming out of the reduction to $L_0$ by exploiting the structure of ranges that are updated. All updated ranges are of length at most M and start at an index of the form M(i−1)+1. Furthermore, the range-efficient $L_0$ algorithm described herein allows deletions, a feature not found in known $L_0$ algorithms.

At a high level, the sketching procedure presented herein works by sub-sampling by powers of 2 the universe [nM] arising out of the reduction to $L_0$. At each level in the sub-sampling, the sketching procedure keeps a corresponding data structure (a.k.a. summary data structure) of size $O(\epsilon^{-2} \log(1/\epsilon))$ to summarize the items that are sub-sampled at the corresponding level. The sketching procedure also maintains another data structure on the side to handle the case when $L_0$ is small, and in parallel, the sketching procedure obtains a constant-factor approximation R of the $L_1$-difference. At the end of the data stream, the sketching procedure provides an estimate of the $L_1$-difference based on the summary data structure that summarizes the items at a level at which the expected number of universe elements sub-sampled is $1/\epsilon^2$, where the level is determined based on R being known. The sub-sampling of the data stream may be implemented using pairwise-independent hash functions, which allows the use a subroutine for quickly counting the number of universe elements that are sub-sampled at each of the log(nM) levels. Given these counts, each of the aforementioned summary data structures may be updated efficiently.

The summary data structure at a given level may be viewed as maintaining (x'−y')H, where H is the parity-check matrix of a linear error-correcting code, and x', y' are the vectors derived from x, y by sub-sampling at that level. When it is ensured that x', y' differ on few coordinates, x'−y' may be treated as a corruption of the encoding of the 0 codeword followed by an attempt to decode to recover the "error" x'−y'. The decoding succeeds as long as the minimum distance of the code is sufficiently high.

Known techniques use the parity-check matrix of a Reed-Solomon code of minimum distance O(k), given that that x', y' differ on at most k coordinates. Decoding may then be done by a known recovery procedure in time $O(k^2+k\text{poly} \log(k) \log(n))$. In one or more embodiments of the present invention, $k=\epsilon^{-2}$; therefore, the method disclosed herein does not use the known recovery procedure because it would be too slow. To avoid this slowness problem, the sketching procedure disclosed herein hashes the indices of x', y' into $O(\epsilon^{-2}/\log(1/\epsilon))$ buckets with an $O(\log(1/\epsilon))$-wise independent hash function, and then keeps in each bucket the product of the difference vector, restricted to the indices mapped to that bucket, with the parity check matrix. With constant probability, no bucket receives more than $O(\log(1/\epsilon))$ indices where x', y' differ. Thus, the sketching procedure disclosed herein may use a Reed-Solomon code with minimum distance only $O(\log(1/\epsilon))$, thereby making the decoding sufficiently fast.

Preliminaries

In the Detailed Description of the Invention section, all space bounds are in bits, and all logarithms are base 2, unless explicitly stated otherwise. Running times are measured as the number of standard machine word operations (i.e., integer arithmetic, bit-wise operations, and bitshifts). Each machine word is assumed to be $\Omega(\log(nM))$ bits so that each vector can be indexed and arithmetic can be done on vector entries in constant time. Also, for integer A, [A] denotes the set $\{1, \ldots, A\}$.

The model in which the sketching procedure runs is formally defined as follows. Alice receives $x \in \{-M, \ldots, M\}^n$, and Bob receives $y \in \{-M, \ldots, M\}^n$. Both computing devices (i.e., Alice and Bob) have access to a shared source of randomness and must, respectively, output bit-strings s(x) and s(y). The requirement is that a third party (e.g., computer system 102 in FIG. 1) can, given access to only s(x) and s(y), compute a value Z such that $Pr[|Z-\|x-y\|_1|>\epsilon\|x-y\|_1] \leq 1/3$. Again, by definition, $\|x-y\|_1=\Sigma_{i=1}^n|x_i-y_i|$. The probability is over the randomness shared by Alice and Bob, and the value $\epsilon \in (0,1]$ is a parameter given to Alice and Bob. The goal is to minimize the lengths of s(x) and s(y), as well as the amount of time Alice and Bob each take to compute them. Without loss of generality, the description of the present invention assumes $x_i, y_i \geq 0$ for all i. This assumption of $x_i, y_i \geq 0$ for all i can be enforced by increasing all coordinates of x, y by M, which does not alter $\|x-y\|_1$. Doing so increases the upper bound on coordinate entries by a factor of two, but this increase alters the sketching procedure's running time and resulting sketch size by subconstant factors.

Since the sketching procedure is presented below as a streaming algorithm, streaming notation is introduced in this section. Consider a vector $f=(f_1, f_2, \ldots, f_n)$ that is updated in a stream as described in this paragraph. The data stream has exactly 2n updates $(i_1, v_1), \ldots, (i_{2n}, v_{2n}) \in [n] \times \{-M, \ldots, M\}$. Each update (i, v) corresponds to the action $f_i \leftarrow f_i+v$. For each $j \in [n]$, there are exactly two stream updates (i, v) with i=j. If these two stream updates are $(i_{z1}, v_{z1})$, $(i_{z2}, v_{z2})$, then at most one of $v_{z1}, v_{z2}$ is negative, and at most one of $v_{z1}, v_{z2}$ is positive. The nonnegative update corresponds to adding $x_i$ to $f_i$, and the nonpositive update corresponds to subtracting $y_i$ from $f_i$. Again, the assumption is that $x_i, y_i \geq 0$. There is no restriction on the possible values for $z_1$ and $z_2$. That is, the sketching procedure described herein functions correctly even if the stream presents an adversarial permutation of the 2n coordinates $x_1, \ldots, x_n, y_1, \ldots, y_n$. At the end of the stream $\|f\|_1=\|x-y\|_1$, so the streaming algorithm must approximate $\|f\|_1$. For Alice and Bob to use the streaming algorithm for sketching, Alice runs the streaming algorithm with updates (i, $x_i$) for each $1 \leq i \leq n$ to produce a sketch, and Bob separately runs the streaming algorithm (using the same random bits) with updates (i, $y_i$) to produce a sketch. The sketches produced are simply the contents of the streaming algorithm's memory at the end of the data stream. It is a consequence of how the streaming algorithm works that these sketches can be combined by a third party (e.g., computer system 102 in FIG. 1) to approximate $\|f\|_1$.

Sketching Procedure

Figure 3:
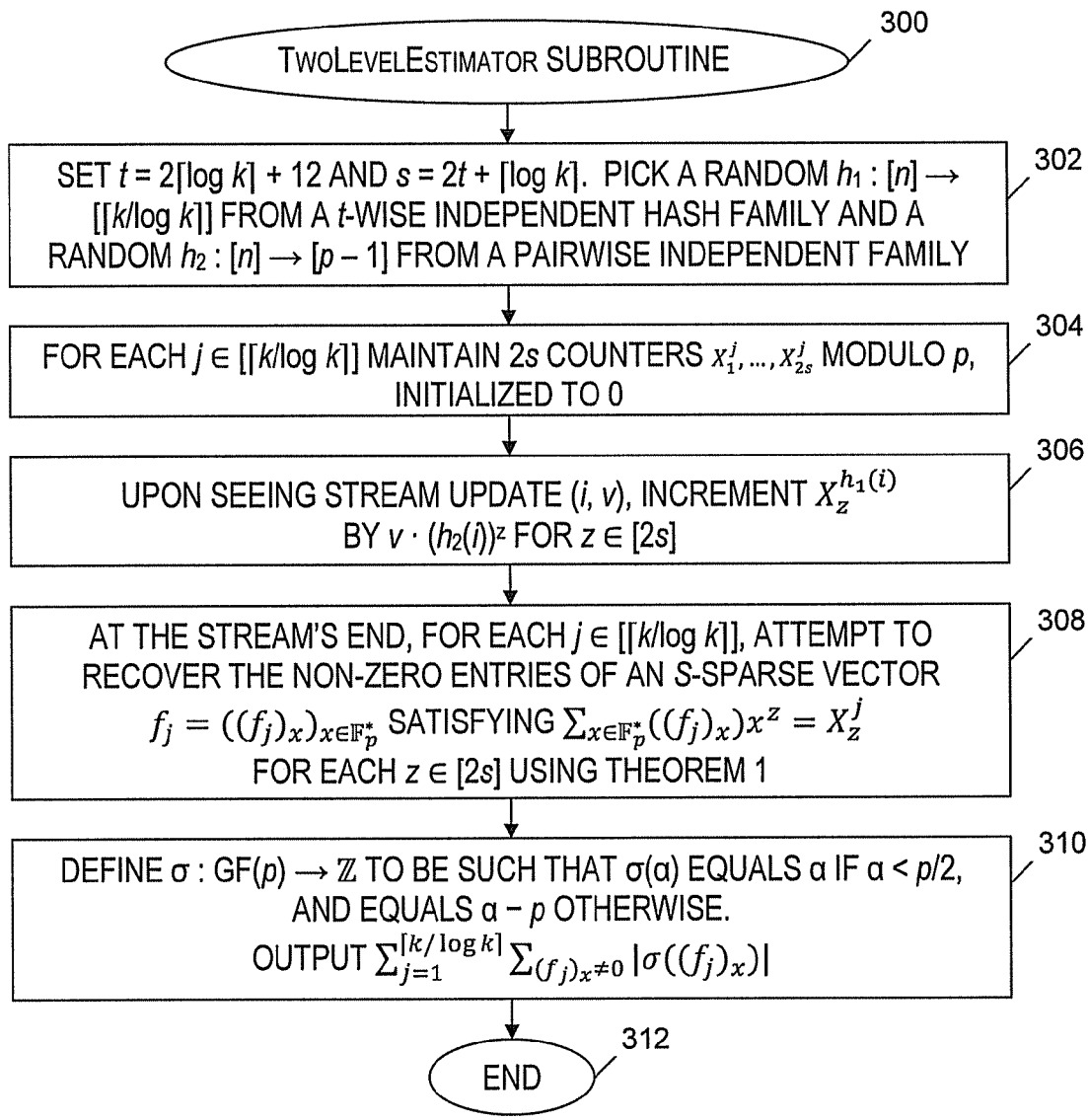
FIG. 3 is a flowchart of a subroutine used for computing an $L_1$ exactly when $L_1$ is small, where the subroutine may be included in the process of FIG. 2, in accordance with embodiments of the present invention.

FIG. 3 is a flowchart of a subroutine used for computing an $L_1$ exactly when $L_1$ is small, where the subroutine may be included in the process of FIG. 2, in accordance with embodiments of the present invention. Throughout this section it is assumed that $\epsilon \geq 1/\sqrt{n}$; otherwise, $\|f\|_1$ can be computed exactly by keeping the entire vector in memory using O(n log M)=O($\epsilon^{-2}$ log M) space with constant update time.

Handling Small $L_1$

FIG. 3 includes steps of a subroutine referred to herein as TwoLevelEstimator. The TwoLevelEstimator subroutine in FIG. 3 computes $L_1$ exactly when promised that $L_1 \leq k$. That is, the subroutine in FIG. 3 computes $\|f\|_1$ exactly when promised $\|f\|_1 \leq k$. This task is trivial if k=1 (i.e., maintain a single counter), so it is assumed that k>1 throughout this section. The subroutine of FIG. 3 begins at step 300. Each of the steps 302-310 described below is performed by software running in computer system 102. In one embodiment, steps 302-310 are performed by $L_1$ difference estimator 114 (see FIG. 1).

In step 302, define t and s as follows: set t=2⌈ log k⌉+12 and set s=2t+⌈ log k⌉. Select a random $h_1$: [n]→[⌈k/log k⌉] from a t-wise independent hash family and select a random $h_2$: [n]→ [p−1] from a pairwise independent family. The value p is calculated prior to step 302 and satisfies Equation 1:

$$C \leq p \leq 2C, C=4 \cdot (5\lceil \log k \rceil+24)^2 \cdot \lceil k/\log k \rceil+1 \qquad (1)$$

Prior to step 302, the following items are calculated: a generator g for the multiplicative group $\mathbb{F}_p^*$ and logarithm tables $T_1, T_2$ such that $T_1[i]=g^i \bmod p$ and $T_2[x]=d \log(x)$, where $0 \leq i \leq p-2$ and $1 \leq x \leq p-1$. As used herein, d log(x) is the discrete logarithm of x (i.e., the $i \in GF(p)$ such that $g^i \equiv x \bmod p$). The choice of k will be relatively small in the final algorithm, so this step will be efficient. As used herein, GF(p) may be replaced with the set {0, 1, 2, 3, ..., p−1}. In general, GF(x) for an integer x denotes the finite field (i.e., Galois field) containing x elements.

In step 304, for each $j \in [\lceil k/\log \rceil]$, maintain 2s counters $X_1^j, \ldots, X_{2s}^j$ modulo p, where the counters are initialized to 0.

In step 306, in response to identifying stream update (i, v), increment $X_z^{h_1(i)}$ by $v \cdot (h_2(i))^z$ for $z \in [2s]$.

In step 308, in response to detecting the stream's end, for each $j \in [\lceil k/\log k \rceil]$, attempt to recover the non-zero entries of an s-sparse vector $f_j=((f_j))_{x \in \mathbb{F}_p^*}$ satisfying $\Sigma_{x \in \mathbb{F}_p^*}((f_j)_x)x^z=X_z^j$ for each $z \in [2s]$ using Theorem 1.

In step 310, define $\sigma$: GF(p)→$\mathbb{Z}$ to be such that $\sigma(\alpha)$ equals $\alpha$ if $\alpha<p/2$, and equals $\alpha-p$ otherwise. Furthermore, in step 310, output $\Sigma_{j=1}^{\lceil k/\log k \rceil} \Sigma_{(f_j)_x \neq 0} |\sigma((f_j)_x)|$. The subroutine in FIG. 3 ends at step 312.

The subroutine TwoLevelEstimator in FIG. 3 makes calls to the following algorithm included in Theorem 1.

Theorem 1. Let p be prime and $r=(r_x)_{x \in \mathbb{F}_p^*}$ have at most s non-zero entries (2s+1<p). Given $\Sigma_{x \in \mathbb{F}_p^*} r_x x^i$ for $i \in [2s]$, there is an algorithm to recover $\{(x, r_x)|r_x \neq 0\}$ which uses $O(s^2+s (\log s)(\log \log s)(\log p))$ field operations over GF(p).

The proof of correctness of the TwoLevelEstimator subroutine relies in part on Lemma 2, which is presented below.

Lemma 2. Let $X_i \in [0,1]$, $1 \leq i \leq n$, be t-wise independent for $t \geq 4$ an even integer, $$X = \sum_{i=1}^n X_i, \text{ and } A > 0.$$

Then $Pr[|X - E[X]| \geq A] \leq 8\left(\frac{tE[x]+t^2}{A^2}\right)^{t/2}$.

Theorem 3. Ignoring the space to store the hash functions $h_1, h_2$ and tables $T_1, T_2$, the TwoLevelEstimator subroutine uses O(k log k) bits of space. The hash functions $h_1, h_2$ and tables $T_1, T_2$ require an additional O((log k) (log n)+k $\log^2$ k) bits. The time to process a stream update is O(log k). If $L_1 \leq k$, the final output value of the TwoLevelEstimator subroutine equals $L_1$ exactly with probability at least ¾.

Proof of Theorem 3: Aside from storing $h_1, h_2, T_1, T_2$, the number of counters is 2s ⌈k/log k⌉=O(k), each of size O(log p)=O(log k) bits, totaling O(k log k) bits. The space to store $h_1$ is O((log k) (log n)), and the space to store $h_2$ is O(log n). The tables $T_1, T_2$ each have p−1=O(k log k) entries, each requiring O(log p)=O(log k) bits. Processing a stream update requires evaluating $h_1, h_2$, taking O(log k) time and O(1) time, respectively. There must be an update of 2s=O(log k) counters (see step 306). Each counter update can be done in constant time with the help of a table lookup since $(h_2(i))^z=g^{z \cdot d \log(h_2(i))}=T_1[(z \cdot T_2[h_2(i)]) \bmod (p-1)]$.

Correctness is analyzed as follows. Define $I=\{i \in [n]: f_i \neq 0\}$ at the stream's end. Note $|I| \leq L_1 \leq k$. For $j \in [\lceil k \log k \rceil]$, define the random variable $Z_j=|h_1^{-1}(j) \cap I|$. Two events Q and Q' are defined below.

Let Q be the event that $Z_j \leq s = 2t + \lceil \log k \rceil$ for all $j \in [\lceil k/\log k \rceil]$.

Let Q' be the event that there do not exist distinct $i, i' \in I$ with both $h_1(i) = h_1(i')$ and $h_2(i) = h_2(i')$.

It is first argued that, conditioned on both Q, Q' holding, the output of the TwoLevelEstimator subroutine is correct. Note $p - 1 \geq 4s^2 \lceil k/\log k \rceil \geq 100k \log k$. Again, recall the definition of s in step 302. If Q' occurs, $|h_2^{-1}(i) \cap h_1^{-1}(j) \cap I| \leq 1$ for all $i \in [p-1]$ and $j \in [\lceil k/\log k \rceil]$. One can then view $X_z^j$ as holding $\Sigma_{x \in \mathbb{F}_p^*}(r_j)_x x^i$, where $(r_j)_x$ is the frequency (modulo p) of the unique element in the set $h_2^{-1}(i) \cap h_1^{-1}(j) \cap I$ (or 0 if that set $h_2^{-1}(i) \cap h_1^{-1}(j) \cap I$ is empty). Conditioned on Q, every $r_j$ is s-sparse, so $r_j$ is correctly recovered in step 308 by Theorem 1 since $2s + 1 = 5\lceil \log k \rceil + 13 < 100k \lceil \log k \rceil < p$. Note that p is strictly greater than twice the absolute value of the largest frequency since $L_1 < k$, and thus negative frequencies are strictly above p/2 in GF(p), and positive frequencies are strictly below p/2. Thus, given that the $r_j$ are correctly recovered, a correctly recovers the actual frequencies in step 310, implying correctness of the final output of the TwoLevelEstimator subroutine.

The proof of Theorem 3 now proceeds to lower bound $\Pr[Q \wedge Q']$. First it is shown that Q holds with probability at least 7/8. Let $Z_{j,i}$ indicate $h_1(i) = j$ and then note the random variables $\{Z_{j,i}\}_{i \in I}$ are t-wise independent and $Z_j = \Sigma_{i \in I} Z_{j,i}$. Also, $E[Z_j] = |I|/\lceil k/\log k \rceil \leq \log k$. Setting $A = 2t$ and applying Lemma 2, $$\Pr[|Z_j - E[Z_j]| \leq 2t] \leq 8\left(\frac{tE[Z_j] + t^2}{A^2}\right)^{t/2} \leq 8\left(\frac{2t^2}{4t^2}\right)^{\log k + 6} \leq \frac{1}{8k}$$

since $E[Z_j] \leq t$. A union bound implies $\Pr[Q] \geq 7/8$.

The proof of Theorem 3 proceeds with an analysis of $\Pr[Q|Q']$, as described below. Let $Y_{i,i'}$ be a random variable indicating $h_2(i) = h_2(i')$ and define the random variable $Y = \Sigma_{(i,i') \in \binom{I}{2}, h_1(i) = h_1(i')} Y_{i,i'}$. Note Q' is simply the event that $Y = 0$. It follows that $$E[Y] = \sum_{j=1}^{\lceil k/\log k \rceil} E_{h_1}\left[\sum_{(i,i') \in \binom{h_1^{-1}(j) \cap I}{2}} \Pr[h_2(i) = h_2(i')]\right] \leq$$

$$\sum_{j=1}^{\lceil k/\log k \rceil} \frac{E[|h_1^{-1}(j) \cap I|^2]/2}{p-1} \leq \sum_{j=1}^{\lceil k/\log k \rceil} \frac{E[|h_1^{-1}(j) \cap I|^2]/2}{4s^2 \lceil k/\log k \rceil}$$

where the first inequality holds by pairwise independence of $h_2$. Conditioned on Q, $|h_1^{-1}(j) \cap I| \leq s$ for all $j$ so that $E[Y|Q] < 1/8$, implying $\Pr[Q'|Q] = 1 - \Pr[Y \geq 1|Q] \geq 7/8$ by Markov's Inequality.

Thus, $\Pr[Q \wedge Q'] = \Pr[Q] \cdot \Pr[Q'|Q] \geq (7/8)^2 > 3/4$, and Theorem 3 is proven.

Remark 1. In step 302, the subroutine twice picks a hash function $h: [a] \rightarrow [b]$ from an m-wise independent family for some integers m and $a \neq b$ (namely $h_1$ and $h_2$). However, known constructions have $a = b$, with a being a prime power. This is easily circumvented. When an h with unequal domain size a and range size b is desired, the TwoLevelEstimator subroutine picks a prime $l \geq 2 \cdot \max\{a, b\}$ and then picks an m-wise independent hash function $h': [l] \rightarrow [l]$ and define $h(x) \stackrel{\text{def}}{=} (h'(x) \bmod b) + 1$. The family of such h is still m-wise independent, and by choice of l, no range value is more than twice more likely than any other, which suffices for the present invention with a slight worsening of constant factors.

Theorem 4 analyzes the pre-processing and post-processing complexity of the TwoLevelEstimator subroutine.

Theorem 4. Ignoring the time needed to find the prime l in Remark 1, the pre-processing time of the TwoLevelEstimator subroutine before seeing the stream is O(k log k), and the post-processing time is O(k log k log log k log log log k).

Proof of Theorem 4. First, with regard to the pre-processing time of the TwoLevelEstimator subroutine, it is known that the prime p and generator g for $\mathbb{F}_p^*$ can be found in time poly log(C) = poly log(k). After p and g are found, filling in $T_1$, $T_2$ takes O(p) = O(k log k) time, which dominates the pre-processing time. The time to allocate the O(k) counters $X_z^j$ is just O(k).

The post-processing work of the TwoLevelEstimator subroutine is done in steps 308 and 310 in FIG. 3. For step 308, there are O(k/log k) values of j, for each of which the algorithm of Theorem 1 is run with s = O(log k) and p = O(k log k), thus requiring a total of O(k log k log log k log log log k) field operations over GF(p). Since the table $T_2$ is precalculated prior to step 302, all GF(p) operations may be done in constant time, including division. In step 310, the absolute values of O(log k) non-zero entries of O(k/log k) vectors $f_j$ must be summed, taking time O(k). Thus, Theorem 4 is proven.

The Full Algorithm in the Sketching Procedure

The full algorithm in the sketching procedure requires, in part, a constant factor approximation to the $L_1$-difference. To obtain this constant factor approximation to the $L_1$-difference, an implementation of the algorithm in Feigenbaum et al. (see Theorem 12 in Feigenbaum et al.) is used with $\epsilon$ a constant.

Theorem 5. There is a one-pass streaming algorithm for $(1 \pm \epsilon)$-approximating the $L_1$-difference using $O(\epsilon^{-2} \log(nM))$ space with update time $O(\epsilon^{-2} \log(nM))$, and succeeding with probability at least 19/20.

Remark 2. The update time in Theorem 5 is $O(\epsilon^{-2}$field(log (nM))), where field(D) is the time to do arithmetic over $GF(2^D)$ (not including division). Feigenbaum et al. notes that field(D) = $O(D^2)$ naively. It suffices for the purposes of the algorithm in Feigenbaum et al. to work over $GF(2^D)$ for the smallest $D \geq \log(nM)$ such that $D = 2 \cdot 3^{79}$, in which case a highly explicit irreducible polynomial of degree D over $\mathbb{F}_2[x]$ can be used to perform $GF(2^D)$ arithmetic in time O(D).

The sketching procedure also makes use of the algorithm presented in Theorem 6.

Theorem 6. Let a, b, c, d, x, r, m be integers fitting in a machine word with m > 0 and a, b, c, d $\in \{0, \ldots, m-1\}$. There is an algorithm to calculate $|\{i: (a \cdot (x + i) + b \bmod m) \in [c, d], 0 \leq i \leq r\}|$ in time O(log(min(a, r))) using O(log(r·m)) space.

Figure 4A:
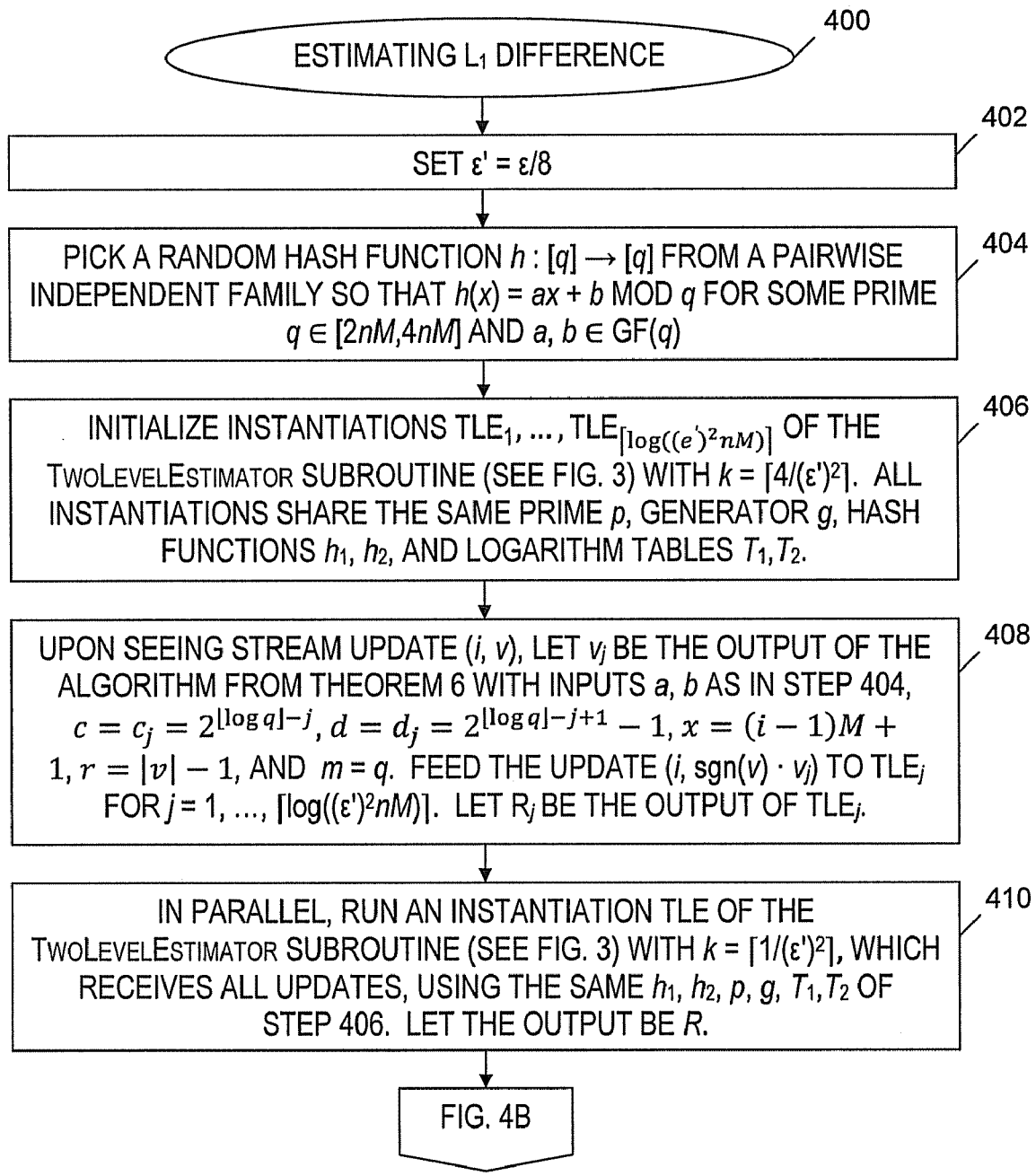
FIGS. 4A-4B depict a flowchart of a method for computing an estimation of $L_1$, where the method may be included in the process of FIG. 2, in accordance with embodiments of the present invention.
Figure 4B:
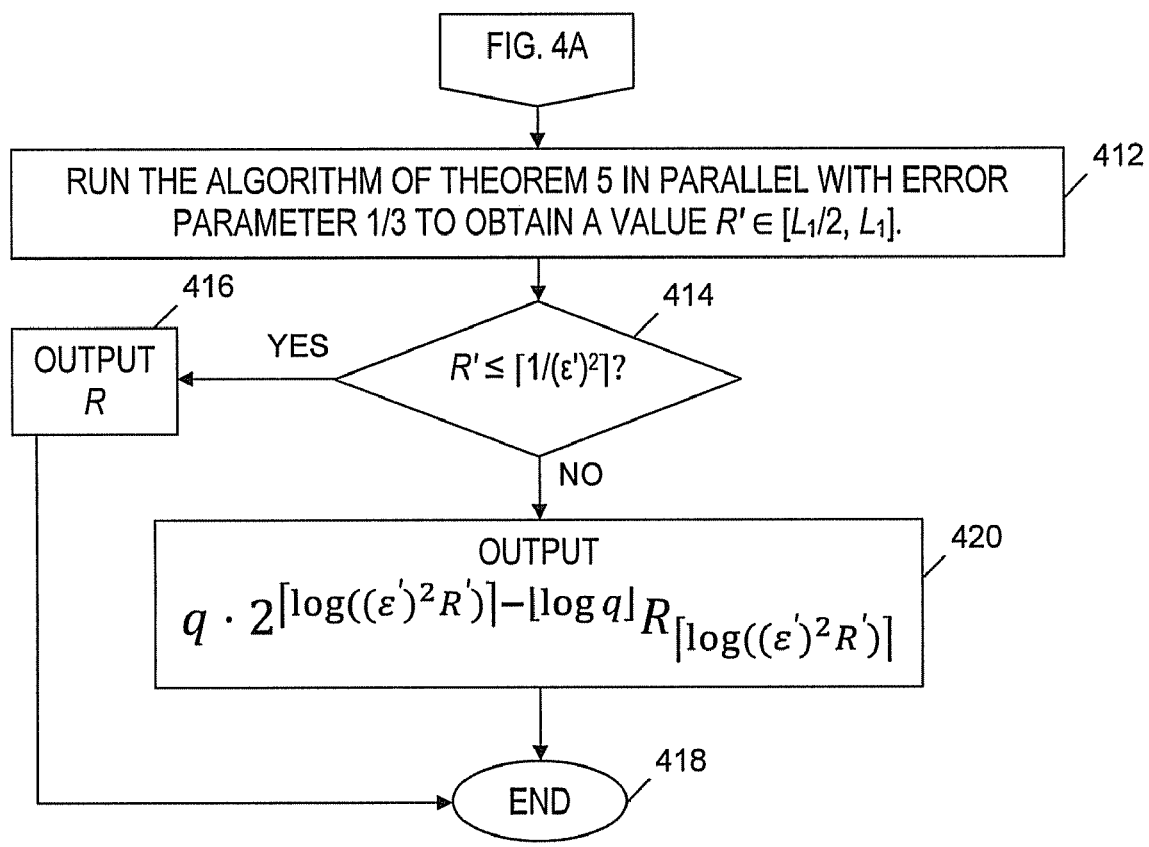

FIGS. 4A-4B depict a flowchart of a method for computing an estimation of $L_1$, where the method may be included in the process of FIG. 2, in accordance with embodiments of the present invention. The method for computing an estimation of $L_1$ is referred to herein as the L1-DIFF method. The L1-DIFF method starts at step 400 in FIG. 4A. Each of the steps 402-410 in FIG. 4A and steps 412-420 in FIG. 4B is performed by software running on computer system 102 (see FIG. 1). In one embodiment, steps 402-410 in FIG. 4A and steps 412-420 in FIG. 4B are performed by $L_1$ difference estimator 114 (see FIG. 1).

In step 402, set $\epsilon' = \epsilon/8$. In step 404, select a random hash function $h: [q] \rightarrow [q]$ from a pairwise independent family so that $h(x) = ax + b \bmod q$ for some prime $q \in [2 nM, 4 nM]$ and a, b $\in GF(q)$.

In step 406, initialize instantiations $TLE_1, \ldots, TLE_{\lceil \log((\epsilon')^2 nM) \rceil}$ of the TwoLevelEstimator subroutine with $k=\lceil 4/(\epsilon')^2 \rceil$. All instantiations initialized in step 406 share the same prime p, generator g, hash functions $h_1, h_2$, and logarithm tables $T_1, T_2$.

In step 408, in response to detecting a stream update (i, v), let $v_j$ be the output of the algorithm from Theorem 6 with inputs a, b as in step 404, $c=c_j=2^{\lfloor \log q \rfloor -j}$, $d=d_j=2^{\lfloor \log q \rfloor -j+1}-1$, $x=(i-1)M+1$, $r=|v|-1$, and $m=q$. Step 408 also includes feeding the update (i, sgn(v)·$v_j$) to $TLE_j$ for $j=1, \ldots, \lceil \log((\epsilon')^2 nM) \rceil$. Furthermore, step 408 includes generating $R_j$ as the output of $TLE_j$.

In step 410, which is performed in parallel with steps 406 and 408, run an instantiation TLE of the TwoLevelEstimator subroutine with $k=\lceil 1/(\epsilon)^2 \rceil$ which receives all the aforementioned updates, using the same $h_1, h_2, p, g, T_1, T_2$ of step 406. Step 410 also includes generating R as the output of the TLE instantiation run with $k=\lceil 1/(\epsilon')^2 \rceil$.

In step 412 of FIG. 4B, which is performed in parallel with steps 406-410 in FIG. 4A, run the algorithm of Theorem 5 with error parameter ⅓ to obtain a value $R' \in [L_1/2, L_1]$.

In inquiry step 414, R' is compared to $\lceil 1/(\epsilon')^2 \rceil$. If step 414 determines that $R' \leq \lceil 1/(\epsilon')^2 \rceil$, then the Yes branch of step 414 is taken and R is output in step 416. Following step 416, the process of FIGS. 4A-4B ends at step 418. Otherwise, if step 414 determines that $R' > \lceil 1/(\epsilon')^2 \rceil$, then the No branch of step 414 is taken and $q \cdot 2^{\lceil \log((\epsilon')^2 R') \rceil - \lfloor \log q \rfloor} R_{\lceil \log((\epsilon')^2 R') \rceil}$ is output in step 420. Following step 420, the process of FIGS. 4A-4B ends at step 418.

Theorem 7. The algorithm L1-DIFF has update time $O(\log(\epsilon^2 nM) \log(M/\epsilon))$ and the bits of space used is $O(\epsilon^{-2} \log(1/\epsilon) \log(\epsilon^{-2} nM))$. The pre-processing time used is $polylog(nM) + O(\epsilon^{-2} \log(1/\epsilon) \log(\epsilon^{-2} nM))$. Time $O(\epsilon^{-2} \log(1/\epsilon) \log \log(1/\epsilon) \log \log \log(1/\epsilon))$ is needed for post-processing. The output is $(1 \pm \epsilon) L_1$ with probability at least ⅔.

Proof of Theorem 7. The hash function h requires $O(\log(nM))$ space. There are $O(\log(\epsilon^2 nM))$ instantiations of the TwoLevelEstimator subroutine (see steps 406 and 410 in FIG. 4A), each with $k=O(\epsilon^{-2})$, taking a total of $O(\epsilon^{-2} \log(1/\epsilon) \log(\epsilon^2 nM))$ space by Theorem 3. The hash functions $h_1, h_2$ and tables $T_1, T_2$ take $O(\log(1/\epsilon) \log(n) + \epsilon^{-2} \log^2(1/\epsilon)) = O(\epsilon^{-2} \log(1/\epsilon) \log n)$ space, also by Theorem 3 (recall the assumption that $\epsilon \geq 1/\sqrt{n}$). Step 412 in FIG. 4B requires only $O(\log(nM))$ space by Theorem 5, since the algorithm is run with error parameter ⅓.

As for running time, in step 406 in FIG. 4A the algorithm of Theorem 6 is called $O(\log(\epsilon^2 nM))$ times, each time with $a < q$ and $r \leq M$, thus taking a total of $O(\log(\epsilon^2 nM) \log(\min(q, M))) = O(\log(\epsilon^2 nM) \log M)$ time. The necessary update must be fed to each $TLE_j$, each time taking $O(\log(1/\epsilon))$ time by Theorem 3. Updating every $TLE_j$ takes time $O(\log(\epsilon^2 nM) \log(1/\epsilon))$.

In pre-processing, a prime q must be selected in the desired range, which can be accomplished by picking numbers at random and testing primality. The expected time is polylog(nM). There must be a preparation of $h_1, h_2, T_1, T_2$ and all the TwoLevelEstimator instantiations, which takes $O(\epsilon^{-2} \log(1/\epsilon) \log(\epsilon^2 nM))$ time by Theorem 4, in addition to the polylog(n) time required to find an appropriate prime l as described in Remark 1. The pre-processing time for step 412 in FIG. 4B is O(1).

In post-processing, the estimate R' from step 412 (see FIG. 4B) must be recovered, which takes O(1) time, and then an estimate from some TwoLevelEstimator instantiation must be recovered, so the time is as claimed in Theorem 7. Note that in post-processing, to save time steps 308 and 310 (see FIG. 3) of the TwoLevelEstimator subroutine should not be run, except at the instantiation whose output is used following step 414 in FIG. 4B.

Correctness is analyzed as follows. Let Q be the event that $R' \in [L_1/2, L_1]$. The analysis henceforth conditions on Q occurring, which happens with probability at least 19/20 by Theorem 5.

For the first case, suppose $L_1 \leq \lceil 1/(\epsilon')^2 \rceil$. Then, TLE computes $L_1$ exactly with probability at least ¾ by Theorem 3, and hence overall outputs $L_1$ exactly with probability at least $(19/20) \cdot (3/4) > 2/3$.

Now, suppose $L_1 > \lceil 1/(\epsilon')^2 \rceil$. In analyzing this case, it helps to view L1-DIFF as actually computing $L_0(f') \stackrel{def}{=} |\{i: f'_i \neq 0\}|$, where an nM-dimensional vector f' is being updated as follows: when receiving an update (i, v) in the stream, conceptually view this update as being |v| updates ((i-1)M+1, sgn(v)), ..., ((i-1)M+|v|, sgn(v)) to the vector f'. Here, the vector f' is initialized to $\vec{0}$. Note that at the stream's end, $L_0(f') = \|f\|_1$.

Let $f'^j$ denote the vector whose ith entry, $i \in [nM]$, is $f'_i$ if $h(i) \in [c_j, d_j]$, and 0 otherwise. That is, $f'^j$ receives stream updates only to items fed to $TLE_j$. For $i \in [nM]$, let $X_{i,j}$ be a random variable indicating $h(i) \in [c_j, d_j]$, and let $X_j = \Sigma_{f'_i \neq 0} X_{i,j}$ so that $X_j = L_0(f'^j)$. Define $p_j \stackrel{def}{=} (d_j - c_j + 1)/q = 2^{\lfloor \log q \rfloor - j}/q$ so that $E[X_{i,j}] = p_j$. Thus, $E[X_j] = p_j \cdot L_0(f')$. Note that $1/2 \leq 2^{\lfloor \log q \rfloor}/q \leq 1$. Also note the following inequalities:

$$\frac{L_0(f')}{2^{\lceil \log((\epsilon')^2 R') \rceil}} \leq \frac{L_0(f')}{(\epsilon')^2 R'} \leq \frac{2}{(\epsilon')^2}$$

and $$\frac{L_0(f')}{2^{\lceil \log((\epsilon')^2 R') \rceil}} \geq \frac{L_0(f')}{2(\epsilon')^2 R'} \geq \frac{2}{2(\epsilon')^2}$$

By the choice of $j = \lceil \log((\epsilon')^2) R' \rceil$ in step 420 of FIG. 4B, it follows that:

$$\frac{16}{\epsilon^2} = \frac{1}{4(\epsilon')^2} \leq E[X_j] \leq \frac{2}{(\epsilon')^2} \text{ since}$$

$$E[X_j] = p_j \cdot L_0(f') = (2^{\lfloor \log q \rfloor}/q) \cdot (L_0(f')/2^j).$$

Let Q' be the event that $|X_j - E[X_j]| \leq \epsilon E[X_j]$. Applying Chebyshev's inequality, $$Pr[Q'] \geq 1 - \frac{Var[X_j]}{\epsilon^2 E^2[X_j]} \geq 1 - \frac{1}{\epsilon^2 E([X_j])} \geq \frac{15}{16}$$

The second inequality holds since h is pairwise independent and $X_j$ is the sum of Bernoulli random variables, implying $Var[X_j] = \Sigma_i Var[X_{i,j}] \leq \Sigma_i E[X_{i,j}] = E[X_j]$. The last inequality holds by choice of $\epsilon' = \epsilon/8$.

Let Q" be the event that TLEj outputs $X_j$ correctly. Now, conditioned on Q', $X_j \geq 2(1+\epsilon)/(\epsilon')^2 \leq 4/(\epsilon')^2$ since $\epsilon \leq 1$. Thus by Theorem 3, $Pr[Q''|Q'] \geq 3/4$. Overall, noting $Pr[Q''|Q \wedge Q'] = Pr[Q''|Q']$ by independence, $L_1$ of the entire stream is computed correctly with probability at least $$Pr[Q \wedge Q' \wedge Q''] = Pr[Q] \cdot Pr[Q'|Q] \cdot Pr[Q''|Q \wedge Q'] \geq (19/20) \cdot (15/16) \cdot (3/4) > 2/3$$

Thus, Theorem 7 is proven.

The streaming algorithm disclosed herein also gives a sketching procedure because, as long as Alice and Bob share randomness, they can generate the same h, $h_1, h_2$, p, g and then separately apply the streaming algorithm to their vectors x, y. The sketch is then just the state of the streaming algorithm's data structures. Since each stream token causes only linear updates to counters, a third party can then take the counters from Bob's sketch and subtract them from Alice's, then do post-processing to recover the estimation of the $L_1$-difference. The running time for Alice and Bob to produce their sketches is the streaming algorithm's pre-processing time, plus n times the update time. The time for the third party to obtain an approximation to $\|x-y\|_1$ is the time required to combine the sketches, plus the post-processing time. This discussion of the sketching procedure leads to Theorem 8, which is presented below.

Theorem 8. Sharing polylog(nM) randomness, two parties Alice and Bob, holding vectors x, y $\in$ {-M, ..., M}$^n$, respectively, can produce $O(\epsilon^{-2} \log(1/\epsilon) \log(\epsilon^2 nM))$-bit sketches s(x), s(y) such that a third party can recover $\|x-y\|_1$ to within (1±$\epsilon$) with probability at least ⅔ given only s(x), s(y). Each of Alice and Bob use time $O(n \log(\epsilon^2 nM) \log(M/\epsilon))$ to produce their sketches. In $O(\epsilon^{-2}(\log(\epsilon^2 nM)+\log(1/\epsilon) \log \log (1/\epsilon) \log \log \log(1/\epsilon)))$ time, the third party can recover $\|x-y\|_1$ to within (1±$\epsilon$).

Note Alice and Bob's running time is always $O(n \log^2 (nM))$ since $\epsilon \geq 1/\sqrt{n}$.

Computer System

Figure 5:
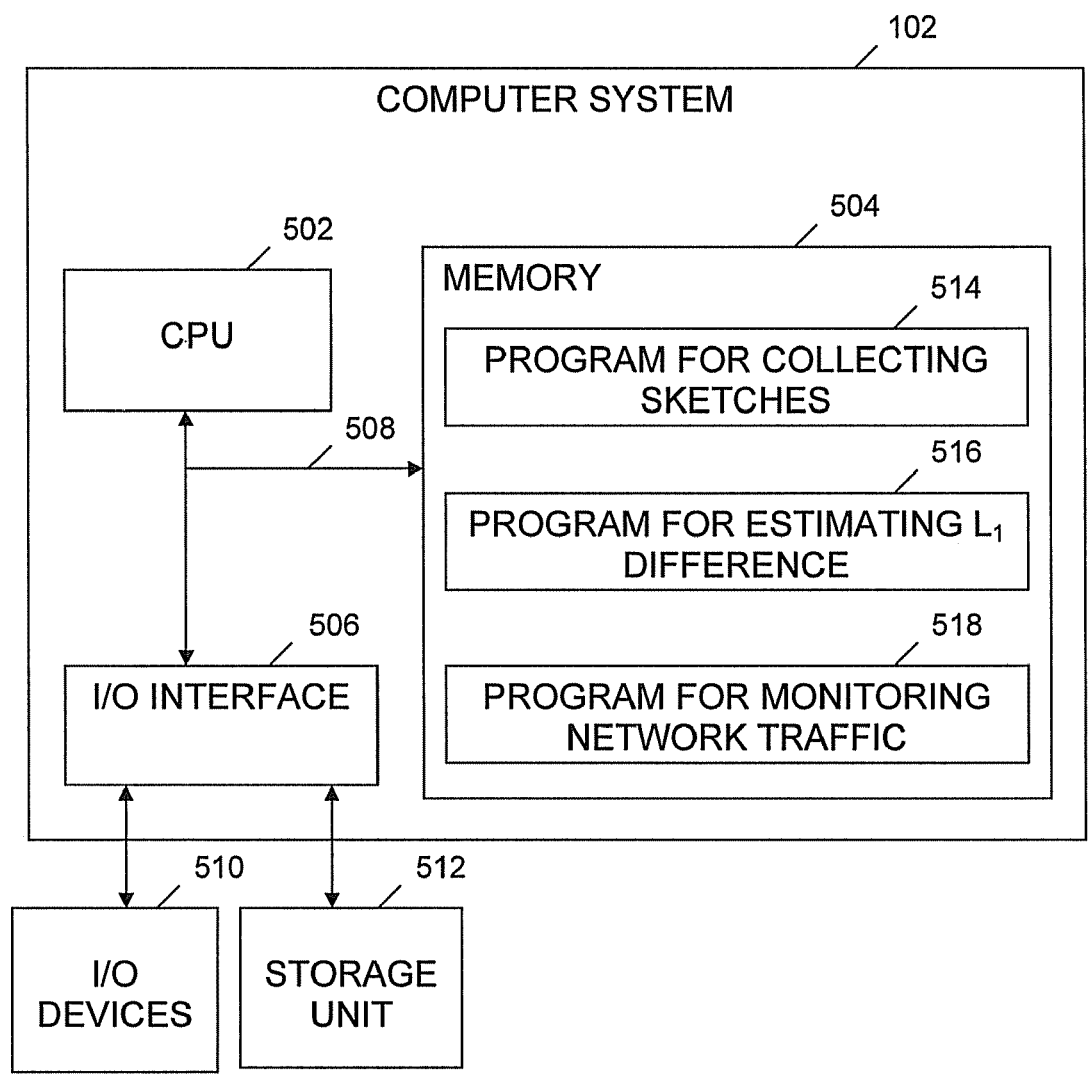
FIG. 5 is a block diagram of a computer system that is included in the system of FIG. 1 and that implements the process of FIG. 2, FIG. 2, FIG. 3 and FIGS. 4A-4B, in accordance with embodiments of the present invention.

FIG. 5 is a block diagram of a computer system that is included in the system of FIG. 1 and that implements the processes of FIG. 2, FIG. 3 and FIGS. 4A-4B, in accordance with embodiments of the present invention. Computer system 102 generally comprises a central processing unit (CPU) 502, a memory 504, an input/output (I/O) interface 506, and a bus 508. Further, computer system 102 may be coupled to I/O devices 510 and a computer data storage unit 512. CPU 502 performs computation and control functions of computer system 102. CPU 502 may comprise a single processing unit, or be distributed across one or more processing units in one or more locations (e.g., on a client and server). In one embodiment, computer system 102 implements sketch collector 112 (see FIG. 1), $L_1$ difference estimator 114 (see FIG. 1), and network traffic monitor 116 (see FIG. 1).

Memory 504 may comprise any known computer readable storage medium, which is described below. In one embodiment, cache memory elements of memory 504 provide temporary storage of at least some program code (e.g., program code 514, 516, 518) in order to reduce the number of times code must be retrieved from bulk storage while instructions of the program code are carried out. Moreover, similar to CPU 502, memory 504 may reside at a single physical location, comprising one or more types of data storage, or be distributed across a plurality of physical systems in various forms. Further, memory 504 can include data distributed across, for example, a local area network (LAN) or a wide area network (WAN).

I/O interface 506 comprises any system for exchanging information to or from an external source. I/O devices 510 comprise any known type of external device, including a display device (e.g., monitor), keyboard, mouse, printer, speakers, handheld device, facsimile, etc. Bus 508 provides a communication link between each of the components in computer system 102, and may comprise any type of transmission link, including electrical, optical, wireless, etc.

I/O interface 506 also allows computer system 102 to store and retrieve information (e.g., data or program instructions such as program code 514, 516 and 518) from an auxiliary storage device such as computer data storage unit 512 or another computer data storage unit (not shown). Computer data storage unit 512 may comprise any known computer readable storage medium, which is described below. For example, computer data storage unit 512 may be a non-volatile data storage device, such as a magnetic disk drive (i.e., hard disk drive) or an optical disc drive (e.g., a CD-ROM drive which receives a CD-ROM disk).

Memory 504 may include computer program code 514, 516 and 518 that provides the logic for collecting sketches, estimating an $L_1$ difference, and monitoring network traffic, respectively, (e.g., the processes of FIG. 2, FIG. 3 and FIGS. 4A-4B). In one embodiment, computer program code 514, 516 and 518 is included in sketch collector 112 (see FIG. 1), $L_1$ difference estimator 114 (see FIG. 1), and network traffic monitor 116 (see FIG. 1), respectively. Further, memory 504 may include other systems not shown in FIG. 5, such as an operating system (e.g., Linux) that runs on CPU 502 and provides control of various components within and/or connected to computer system 102.

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., system 100 in FIG. 1 or computer system 102). Furthermore, an embodiment of the present invention may take the form of a computer program product embodied in one or more computer readable medium(s) (e.g., memory 504 or computer data storage unit 512) having computer readable program code (e.g., program code 514, 516 and/or 518) embodied or stored thereon.

Any combination of one or more computer readable medium(s) (e.g., memory 504 and computer data storage unit 512) may be utilized. The computer readable medium may be a computer readable storage medium or a computer readable signal medium. A computer readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with a system, apparatus, or device for carrying out instructions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 514, 516 and/or 518) embodied on a computer readable medium may be transmitted using any appropriate medium, including but not limited to wireless, wireline, optical fiber cable, RF, etc., or any suitable combination of the foregoing.

Computer program code (e.g., program code 514, 516 and/or 518) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 5. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2, FIG. 3 and FIGS. 4A-4B) and/or block diagrams of methods, apparatus (systems) (e.g., FIG. 1 and FIG. 5), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 514). These computer program instructions may be provided to a processor (e.g., CPU 502) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 504 or computer data storage unit 512) that can direct a computer (e.g., computer system 102), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of monitoring network traffic by estimating an $L_1$ difference. Thus, an embodiment of the present invention discloses a process for supporting computer infrastructure, comprising integrating, hosting, maintaining and deploying computer-readable code (e.g., program code 514, 516 and 518) into a computer system (e.g., computer system 102), wherein the code in combination with the computer system is capable of performing a process of monitoring network traffic by estimating an $L_1$ difference.

In another embodiment, the invention provides a business method that performs the process steps of the invention on a subscription, advertising and/or fee basis. That is, a service provider, such as a Solution Integrator, can offer to create, maintain, support, etc. a process of monitoring network traffic by estimating an $L_1$ difference. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2, FIG. 3 and FIGS. 4A-4B and the block diagrams in FIG. 1 and FIG. 5 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 514, 516 or 518), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of monitoring network traffic by estimating an $L_1$ difference, said method comprising:

receiving a first sketch s(x) from a first network device and a second sketch from a second network device, wherein said first sketch describes a first set of pairs of data (x, $f_t(x)$), wherein x indicates a source and a destination of a first plurality of data packets that include input x, transmitted via said first network device, wherein $f_t(x)$ indicates a first amount of information in said first plurality of data packets transmitted via said first network device from said source to said destination in a time period t, wherein said second sketch s(y) describes a second set of pairs of data (y, $f_{t'}(y)$), wherein y indicates said source and said destination of a second plurality of data packets that include input y transmitted via said second network device, wherein $f_{t'}(y)$ indicates a second amount of information in said second plurality of data packets transmitted via said second network device from said source to said destination in a time period t';

a processor of a computer system estimating an $L_1$ difference $\|f_t(x)-f_{t'}(y)\|_1$, wherein said estimating said $L_1$ difference includes determining an $L_0$ value of a data stream resulting from said first network device inserting elements of a first set of distinct items as insertions into said data stream and from said second network device inserting elements of a second set as deletions from said data stream, wherein said first set includes distinct items derived from $x_i$, wherein said second set of distinct items includes distinct items derived from $y_i$, and wherein said determining said $L_0$ value includes processing updates to ranges of said data stream; and determining a pattern of said network traffic based on said $L_1$ difference.

2. The method of claim 1, wherein said determining said $L_0$ value further includes:

converting $x_i$ to said first set of distinct items, wherein said first set of distinct items contains $M(i-1)+1, \ldots, M(i-1)+x_i$, wherein each $x_i$ is an element of $\{-M, \ldots, M\}^n$;

converting $y_i$ to said second set of distinct items, wherein said second set of distinct items contains $M(i-1)+1, \ldots, M(i-1)+y_i$, wherein each $y_i$ is an element of $\{-M, \ldots, M\}^n$;

inserting said $M(i-1)+1, \ldots, M(i-1)+x_i$ into said data stream;

deleting said $M(i-1)+1, \ldots, M(i-1)+y_i$ from said data stream; and in response to said inserting and said deleting, determining said $L_0$ value as $\|x-y\|_1$, wherein said $L_0$ value is a number of non-zero elements in a vector $(x-y)$.

3. The method of claim 2, wherein said estimating said $L_1$ difference further includes:

in response to said determining said $L_0$ value, sub-sampling a universe of $[nM]$ in a plurality of levels by a plurality of powers of two;

maintaining a plurality of summary data structures, wherein each summary data structure summarizes a corresponding plurality of items that are sub-sampled by said sub-sampling at a corresponding level of said plurality of levels;

determining a constant-factor approximation R of said $L_1$ difference;

determining a level of said plurality of levels at which an expected number of elements of said universe sub-sampled by said sub-sampling is $\theta(1/\epsilon^2)$, wherein said level is determined based on R being known, and wherein c is a parameter received by said first network device and by said second network device; and determining an estimate of said $L_1$ difference based on a summary data structure of said plurality of summary data structure, wherein said summary data structure summarizes a plurality of items at said level.

4. The method of claim 3, wherein said sub-sampling said universe of $[nM]$ in said plurality of levels by said plurality of powers of two includes:

setting $\epsilon'=\epsilon/8$;

selecting a random hash function h: $[q] \to [q]$ from a pairwise independent family so that $h(x)=ax+b \mod q$ for a prime $q \in [2nM, 4nM]$ and $a, b \in GF(q)$; and initializing instantiations $TLE_1, \ldots, TLE_{\lceil log((\epsilon')^2 nM) \rceil}$ of a subroutine that computes said $L_1$ difference exactly if said $L_1$ difference $\leq k$, wherein $k=\lceil 4/(\epsilon')^2 \rceil$.

5. The method of claim 4, further comprising:

detecting a stream update $(i, v)$; and in response to said detecting said stream update $(i, v)$, feeding an update $(i, sgn(v) \cdot v_j)$ to $TLE_j$ for $j=1, \ldots, \lceil log((\epsilon')^2 nM) \rceil$, wherein $v_j$ is an output of a procedure for calculating $|\{i: (\alpha \cdot (x+i) + b \mod m) \in [c, d], 0 \leq i \leq r\}|$, wherein $c=c_j=2^{\lfloor log\, q \rfloor -j}$, $d=d_j=2^{\lfloor log\, q \rfloor -j+1}-1$, $x=(i-1)M+1$, $r=|v|-1$, and $m=q$, and wherein $R_j$ is an output of $TLE_j$.

6. The method of claim 5, further comprising:

running an instantiation TLE of said subroutine with $k=\lceil 1/(\epsilon')^2 \rceil$; and generating R as an output of said instantiation TLE.

7. The method of claim 6, further comprising:

running a one-pass streaming algorithm for $(1\pm\epsilon)$-approximating said $L_1$ difference $(L_1)$ using error parameter $1/3$, using $O(\epsilon^{-2} \log(nM))$ space with update time $O(\epsilon^{-2} \log(nM))$, wherein said one-pass streaming algorithm succeeds with probability at least 19/20; and obtaining a value $R' \in [L_1/2, L_1]$ as a result of said running said one-pass streaming algorithm.

8. The method of claim 7, wherein said estimating said $L_1$ difference includes determining $R' \leq \lceil 1/(\epsilon')^2 \rceil$ or $R' > \lceil 1/(\epsilon')^2 \rceil$;

outputting R as a result of determining $R' \leq \lceil 1/(\epsilon')^2 \rceil$; and outputting $q \cdot 2^{\lfloor log((\epsilon')^2 R') \rfloor - \lfloor log\, q \rfloor} R_{\lfloor log((\epsilon')^2 R') \rfloor}$ as a result of determining $R' > \lceil 1/(\epsilon')^2 \rceil$.

9. The method of claim 1, wherein said first network device is a first router and wherein said second network device is a second router.

10. The method of claim 1, wherein said first amount of information is a first total number of bytes in said first plurality of data packets transmitted via said first network device from said source to said destination in said time period t, and wherein said second amount of information is a second total number of bytes in said second plurality of data packets transmitted via said second network device from said source to said destination in said time period t'.

11. The method of claim 1, further comprising:

said first network device computing said first sketch $s(x)$ in $O(n \log^2(nM))$ processing time; and said second network device computing said second sketch $s(y)$ in said $O(n \log^2(nM))$ processing time, wherein said $O(n \log^2(nM))$ processing time is independent of $\epsilon$.

12. The method of claim 1, wherein said first router and said second router are the same router.

13. The method of claim 1, wherein said first router and said second router are different routers.

14. The method of claim 1, wherein said time period t and said time period t' are the same time period.

15. The method of claim 1, wherein said time period t and said time period t' are different time periods.

16. A computer system comprising:

a processor; and a computer-readable memory unit coupled to said processor, said memory unit containing instructions executable by said processor to implement a method of monitoring network traffic by estimating an $L_1$ difference, said method comprising:

receiving a first sketch $s(x)$ from a first network device and a second sketch from a second network device, wherein said first sketch describes a first set of pairs of data $(x, f_t(x))$, wherein x indicates a source and a destination of a first plurality of data packets that include input $x_i$ transmitted via said first network device, wherein $f_t(x)$ indicates a first amount of information in said first plurality of data packets transmitted via said first network device from said source to said destination in a time period t, wherein said second sketch $s(y)$ describes a second set of pairs of data $(y, f_{t'}(y))$, wherein y indicates said source and said destination of a second plurality of data packets that include input $y_i$ transmitted via said second network device, wherein $f_{t'}(y)$ indicates a second amount of information in said second plurality of data packets transmitted via said second network device from said source to said destination in a time period t';

estimating an $L_1$ difference $\|f_t(x)-f_{t'}(y)\|_1$, wherein said estimating said $L_1$ difference includes determining an $L_0$ value of a data stream resulting from said first network device inserting elements of a first set of distinct items as insertions into said data stream and from said second network device inserting elements of a second set as deletions from said data stream, wherein said first set includes distinct items derived from $x_i$, wherein said second set of distinct items includes distinct items derived from $y_i$, and wherein said determining said $L_0$ value includes processing updates to ranges of said data stream; and determining a pattern of said network traffic based on said $L_1$ difference.

17. The system of claim 16, wherein said determining said $L_0$ value further includes:
  converting $x_i$ to said first set of distinct items, wherein said first set of distinct items contains $M(i-1)+1, \ldots, M(i-1)+x_i$, wherein each $x_i$ is an element of $\{-M, \ldots, M\}^n$;
  converting $y_i$ to said second set of distinct items, wherein said second set of distinct items contains $M(i-1)+1, \ldots, M(i-1)+y_i$, wherein each y is an element of $\{-M, \ldots, M\}^n$;
  inserting said $M(i-1)+1, \ldots, M(i-1)+x_i$ into said data stream;
  deleting said $M(i-1)+1, \ldots, M(i-1)+y_i$ from said data stream; and
  in response to said inserting and said deleting, determining said $L_0$ value as $\|x-y\|_1$, wherein said $L_0$ value is a number of non-zero elements in a vector $(x-y)$.

18. The system of claim 17, wherein said estimating said $L_1$ difference further includes:
  in response to said determining said $L_0$ value, sub-sampling a universe of $[nM]$ in a plurality of levels by a plurality of powers of two;
  maintaining a plurality of summary data structures, wherein each summary data structure summarizes a corresponding plurality of items that are sub-sampled by said sub-sampling at a corresponding level of said plurality of levels;
  determining a constant-factor approximation R of said $L_1$ difference;
  determining a level of said plurality of levels at which an expected number of elements of said universe sub-sampled by said sub-sampling is $\theta(1/\epsilon^2)$, wherein said level is determined based on R being known, and wherein c is a parameter received by said first network device and by said second network device; and
  determining an estimate of said $L_1$ difference based on a summary data structure of said plurality of summary data structure, wherein said summary data structure summarizes a plurality of items at said level.

19. A computer program product comprising:
a non-transitory computer readable storage medium having a computer readable program code stored therein, said computer readable program code containing instructions executable by a processor of a computer system to implement a method of monitoring network traffic by estimating an $L_1$ difference, said method comprising:
  receiving a first sketch s(x) from a first network device and a second sketch from a second network device, wherein said first sketch describes a first set of pairs of data $(x, f_t(x))$, wherein x indicates a source and a destination of a first plurality of data packets that include input $x_i$ transmitted via said first network device, wherein $f_t(x)$ indicates a first amount of information in said first plurality of data packets transmitted via said first network device from said source to said destination in a time period t, wherein said second sketch s(y) describes a second set of pairs of data $(y, f_{t'}(y))$, wherein y indicates said source and said destination of a second plurality of data packets that include input $y_i$ transmitted via said second network device, wherein $f_{t'}(y)$ indicates a second amount of information in said second plurality of data packets transmitted via said second network device from said source to said destination in a time period t';
  estimating an $L_1$ difference $\|f_t(x)-f_{t'}(y)\|_1$, wherein said estimating said $L_1$ difference includes determining an $L_0$ value of a data stream resulting from said first network device inserting elements of a first set of distinct items as insertions into said data stream and from said second network device inserting elements of a second set as deletions from said data stream, wherein said first set includes distinct items derived from $x_i$, wherein said second set of distinct items includes distinct items derived from $y_i$, and wherein said determining said $L_0$ value includes processing updates to ranges of said data stream; and
  determining a pattern of said network traffic based on said $L_1$ difference.

20. The program product of claim 19, wherein said determining said $L_0$ value further includes:
  converting $x_i$ to said first set of distinct items, wherein said first set of distinct items contains $M(i-1)+1, \ldots, M(i-1)+x_i$, wherein each $x_i$ is an element of $\{-M, \ldots, M\}^n$;
  converting $y_i$ to said second set of distinct items, wherein said second set of distinct items contains $M(i-1)+1, \ldots, M(i-1)+y_i$, wherein each $y_i$ is an element of $\{-M, \ldots, M\}^n$;
  inserting said $M(i-1)+1, \ldots, M(i-1)+x_i$ into said data stream;
  deleting said $M(i-1)+1, \ldots, M(i-1)+y_i$ from said data stream; and
  in response to said inserting and said deleting, determining said $L_0$ value as $\|x-y\|_1$, wherein said $L_0$ value is a number of non-zero elements in a vector $(x-y)$.

* * * * *